United States Patent
Banatwala et al.

(10) Patent No.: US 9,756,008 B2
(45) Date of Patent: Sep. 5, 2017

(54) BRIDGING RELATIONSHIPS ACROSS ENTERPRISE AND PERSONAL SOCIAL NETWORKS

(71) Applicant: International Business Machines Corporation, Armonk, NY (US)

(72) Inventors: Mustansir Banatwala, Hudson, NH (US); David A. Brooks, Arlington, MA (US); Maureen G. Leland, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 14/492,797

(22) Filed: Sep. 22, 2014

(65) Prior Publication Data

US 2016/0088030 A1   Mar. 24, 2016

(51) Int. Cl.
G06F 17/30 (2006.01)
H04L 12/58 (2006.01)
G06Q 30/02 (2012.01)
G06Q 50/00 (2012.01)

(52) U.S. Cl.
CPC ........ H04L 51/32 (2013.01); G06F 17/30867 (2013.01); G06Q 30/02 (2013.01); G06Q 50/01 (2013.01)

(58) Field of Classification Search
None
See application file for complete search history.

(56) References Cited

U.S. PATENT DOCUMENTS

| | | | |
|---|---|---|---|
| 8,250,096 B2 * | 8/2012 | Su | G06F 17/30867 705/35 |
| 2009/0177744 A1 * | 7/2009 | Marlow | G06Q 10/10 709/204 |
| 2012/0215865 A1 | 8/2012 | Sacks et al. | |
| 2013/0006733 A1 | 1/2013 | Fisher | |
| 2013/0091221 A1 | 4/2013 | Bennett | |
| 2013/0304727 A1 * | 11/2013 | Poon | G06F 17/30477 707/722 |
| 2013/0318085 A1 * | 11/2013 | Pepper | G06Q 10/10 707/737 |

OTHER PUBLICATIONS

List of IBM Patents or Patent Applications Treated as Related dated Dec. 11, 2015, 2 pages.

* cited by examiner

*Primary Examiner* — Son T Hoang
(74) *Attorney, Agent, or Firm* — Scully, Scott, Murphy & Presser, P.C.; L. Jeffrey Kelly

(57) ABSTRACT

A user interface (UI) may be provided that allows a user to connect a first identity in a first social community to another identity in another social community by allowing the user to specify the first identity and another identity. Responsive to a user utilizing the UI, the user may be presented with an option to identify connections in the first social community according to a criteria with members associated with another identity in said another social community. A list of identified connections may be presented.

16 Claims, 3 Drawing Sheets

BRIDGING RELATIONSHIPS ACROSS ENTERPRISE AND PERSONAL SOCIAL NETWORKS

FIELD

The present application relates generally to computers, and computer applications, and more particularly to social analytics, computing, collaboration and communications.

BACKGROUND

With the popularization of social software in the enterprise and on the public internet, individual users will have multiple identities that span their personal and professional life, and at times a single account spanning both worlds (e.g., some micro-blogging posts may be both personal and professional). An aspect of becoming a social business or social enterprise is to enable one's employees to best interact with public social tools such as social networking tools, micro-blogging tools and the like, via building connections. A reliance on communication, transparency, trust, and other characteristics of a personal network, or friends may be beneficial in forging a brand and engaging an audience.

Internal advocacy from one's employees out to the broader internet is an area that is often driven by individual leadership. These are often highly social and well connected employees. But this approach may break down as an organization reaches out to engage its broader employee base to effectively represent their brand with the most relevant set of information.

Connecting with external social networking accounts traditionally looks at how to pull data from the outside to inside, for instance, micro-blog updates of a user into the user's enterprise social network account. This type of integration may allow for more content on the enterprise's internal network, but does not help the enterprise's business to leverage social media to crowdsource external collaboration and reputation.

BRIEF SUMMARY

A system and a method to bridge relationships across social networks, e.g., online social communities may be provided. A method, in one aspect, may comprise providing a user interface (UI) that allows a user to connect a first identity in a first social community to a second identity in another social community by allowing the user to specify the first identity and the second identity. The method may also comprise linking the first identity and the second identity responsive to the user specifying the first identify and the second identity. The method may further comprise, responsive to a user utilizing the UI, presenting the user with an option to identify one or more connections in the first social community according to a criteria with members associated with another identity in another social community. The method may also comprise identifying the one or more connections based on the criteria responsive to the user selecting an option by searching for linked identities in the first social community and another social community and by filtering the linked identities by the criteria. The method may further comprise presenting one or more connections to the user.

A system to bridge relationships across social networks, in one aspect, may comprise a storage device, a hardware processor, and a user interface module executing on the hardware processor. The user interface module may be operable to receive a user specified first identity associated with a first online social community and a user specified second identity associated with another social community. The hardware processor may be operable to link the first identity and the second identity responsive to receiving the first identify and the second identity and store the linked first identity and the second identity in the storage device. The user interface module may be further operable to present to a user an option to identify one or more connections in the first social community according to a criteria with members associated with another identity in another social community. The hardware processor may be further operable to identify one or more connections based on the criteria responsive to the user selecting the option by searching for linked identities in the first social community and another social community and by filtering the linked identities by the criteria. The user interface module may be further operable to present one or more connections to the user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
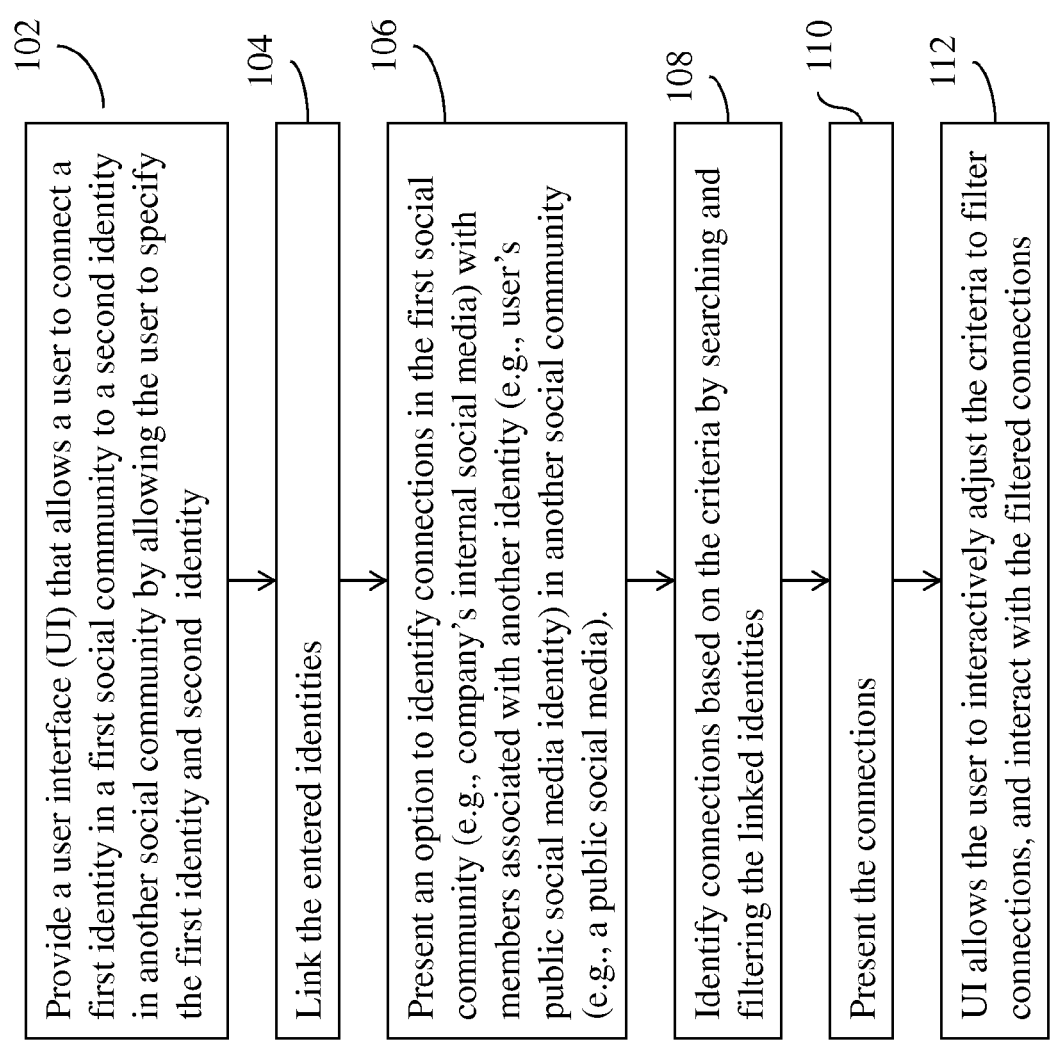
FIG. 1 is a flow diagram illustrating a method of the present disclosure in one embodiment.

Social media refers to computer-based applications that allow people to interact socially, e.g., share and exchange information as on-line virtual communities and networks. Social media may take forms of social networks, blogs, micro-blogs and others. For example, public social media may be implemented in internet-based applications. Enterprise social media refers to social media used in enterprise or business context, for example, as part of a corporate intranet or like. In social media, a user has an account or profile (also referred to as an identity), used in communicating with others.

In one embodiment of a methodology of the present disclosure, identities of different social media may be connected. For example, external identities or handles of public social media (e.g., social network) may be connected to internal social media (e.g., social network) of an enterprise. For instance, in addition to pushing information to an internal network, by knowing the connections between the identities on an internal network with identities on an external network, a user may be allowed to easily explore enterprise contacts that are most appropriate for a context, e.g., if the employee is in this context.

In the following description, the terms internal and external are used within a perspective from one social media or community. For instance, internal users are users internal to a social media or community, external users are users that are outside of that social media or community, e.g., belonging to another social media or community. In addition, while the below examples refer to a company's social media as internal and public media as external, the methodology of the present disclosure may work with any two or more different social media application, with one being considered as internal and others being considered as external.

In one aspect, profiles of users of social media may be extended, in which the users are allowed to provide his/her external identities (one or more identities used by the users in other social media applications). Using the external identities, social contacts of the external identities may be leveraged to find information about other users. For example, once a user provides information about their external identities, members associated with those external identities may be identified.

Consider as an example use case, that user A is browsing a micro-blogging site and encounters a posting by user B commenting on user A's company's new product. User A knows very little about this user B and is not an expert on this topic. However, user A wants to ensure that the right people in the company see user B's comment (e.g., which may be a question) and address it, e.g., provide an answer. Hence, user A would like to know, who in the company knows user B so that the comment can be addresses appropriately. Is anyone in user A's company connected to user B or who is the right person in the company to address a comment or question on the new product? If this information is not available to user A, user A is likely to move on, not respond, and not make a connection with his co-worker who can best respond.

In one aspect, a methodology of the present disclosure allows user A to make these connections, leveraging a network of employees to crowdsource information when interacting with the social web. If user A could immediately find out which co-workers have relationships with this user B, and how the identified co-worker(s) and user B interact, user A may be able to use this information to better prepare a response or channel attention of the relevant people to this comment. For example, with the methodology of the present disclosure in one embodiment, user A may be able to determine whether user B is well connected with user A's company, with whom in the company user B is connected, how other employees of user A's company interact with user B. User A may also be able to reach out to these connections to drive a "friendly" interaction with the external user B.

In another aspect, the methodology of the present disclosure may enable user A to find a subject matter expert who might be best able to engage in a response to the comment by user B. For example, based on hash tags, authored content, and/or other information available on social media content of users, an internal social media application may identify experts on the topic associated with user B's comment. The methodology in one embodiment of the present disclosure may then filter experts who have a registered external handle (connected to an external social media), and identify one or more expert that have a network relationship with the external user, user B in this example.

The above-described user case example illustrates how a user may look inward into an organization (e.g., via connected internal and external identities) based on an external user (user outside the organization) posting on public social media, e.g., determining who internally has a relationship with an author who posted on a public social media.

FIG. 1 is a flow diagram illustrating a method of the present disclosure in one embodiment. At 102, a user interface (UI) may be provided that allows a user to connect a first identity in a first online social community to a second identity in another online social community by allowing the user to specify the first identity and the second identity. The UI may be part of the enterprise social network application functionality. For instance, a user of an internal network, e.g., organization's internal social media (or social community) application (e.g., chat, messaging, networking application) may be allowed to specify or connect the user's internal social media identity with user's other identity in another social media. The other social media or social community may be, for instance, a public social media. The user, for example, may enter via the UI the user's internal social community identity and the user's external (e.g., public or outside of the organization) social community identity for connecting.

This user entered connection or association of the identities may be stored or saved. In one embodiment, the connections may be saved as part of the user's profile associated with the internal social media application. Briefly, a user of a social media has a user profile that stores information associated with the user.

As many users (e.g., employees of an organization) connect their external accounts/identities to their enterprise identity, the two social graphs (information from two social communities) may be merged, providing a new source of information. The following illustrates a connection that may be established based on the user entered identity connections: User A (in CompanyA) is also @userA (networked with @userX and @userY), User B (in CompanyA) is also @userB (networked with @userA, @userZ), User C (in CompanyA) is also @userC (networked with @userB, @userD, @userE), wherein, @userX, @userY, @userE, @userD—are NOT employees of CompanyA or members of CompanyA's social media or network.

A user may enter the user's external social media identity, specifying the external social media. A methodology of the present disclosure in one embodiment may find user connections on the external site based on the network (connections) of a poster (using posting content) and the handle individually provided for users on the internal site. In another aspect, the user may enter other users or members of the external social media with whom the user is connected with.

At 104, for example, the entered identities are linked, for example, by storing the identities in the user's profile in the user's first social community (e.g., user's company's internal social media application). For instance, an employee is able to link their external identities to their profiles in the company's enterprise social media.

With the merged social graphs, the enterprise social media can provide a service to bridge the user back to appropriate contacts and resources, e.g., when browsing the web.

At 106, responsive to a user utilizing the UI, a user (e.g., any user of a company's internal social media application) may be presented with an option to identify connections in the first social community (e.g., company's internal social media) with members associated with another identity (e.g., user's public social media identity) in another social community (e.g., a public social media). The user may indicate an option to identify connections according to one or more criteria. For example, a capability may be provided to learn information about this external identity such as the user's network, common hash tags, expertise, and members of the external that share common aspects with the user, and other information. For example, a browser plugin or bookmarklet may be implemented that extracts the context of the external post, user's handle, its hash tags, and the user's network (connections) and query the internal network to find matching entities. This call back may use REST APIs to locally gather response and display results to the end user, e.g., in a model dialog or a new window. REST API refers to Representational state transfer application programming interface. Those members of the external social community that share the common aspects (e.g., common hash tags, expertise, interested topics, a product, a selected text, a posting, a group membership, a department, an organization, company, and/or others) with identities in the internal social media may be selected and presented. The UI may be part of a browser such as a web browser.

Thus, for example, at 108, connections may be identified based on the criteria by searching and filtering the linked identities. At 110, the connections may be presented to the user.

At 112, the UI allows the user to interactively adjust the criteria to filter connections, and interact with the filtered connections.

As another example, consider UserA reading his microblog feed and encountering a blog by @UserB about topic X at company Y. Understanding that this may be relevant to his business, userA tries to analyze this blog in a few dimensions: is this relevant to my company? If he determines it is, who should he call attention to inside the company about this so the company can provide a response or react appropriately? Is @UserB known to anyone inside UserA's company, e.g., who might be better suited to provide a response? The methodology of the present disclosure in one embodiment allows UserA who is reading content, e.g., on the web, to cross-reference or associate what he is reading with a set of people inside his organization who might be best suited to put together a response or determine how it affects the organization and formulate a plan.

In one embodiment of the methodology of the present disclosure, a browser application may be enhanced to implement a new toolbar button or another user interface element. Responsive to a user selecting (e.g., clicking on this button) the button or element, the methodology of the present disclosure in one embodiment may present a panel or like user interface window listing the identities associated with the internal social community (e.g., the company's internal social media), for example, employees of a company, who have a network relationship with @UserB. This list may be identified by searching the internal-external connections entered by users and stored, e.g., via profiles of the users (e.g., as described above with reference to FIG. 1 at 102 and 104). For example, because each of these employees have made the bridge between their internal and external identities, all internal users can extract an external list of users, and find which of these users are also internal users. As a specific example of a technical approach, matches of the network (connections) of the external poster may be looked for on the internal network via an appropriate search on the REST API.

In one aspect, the external list of users may be used to access information about the external list of users and other members that are associated with one or more of the external list of users. For example, @UserB may be associated with an organization's employee via that employee's external identity. This may be discovered by searching the information associated with the employee's external identity for connections to @UserB. For instance, with an external association (e.g., from a follower, network, etc), the REST API may be used to find an appropriate binding to an employee internally.

Figure 2:
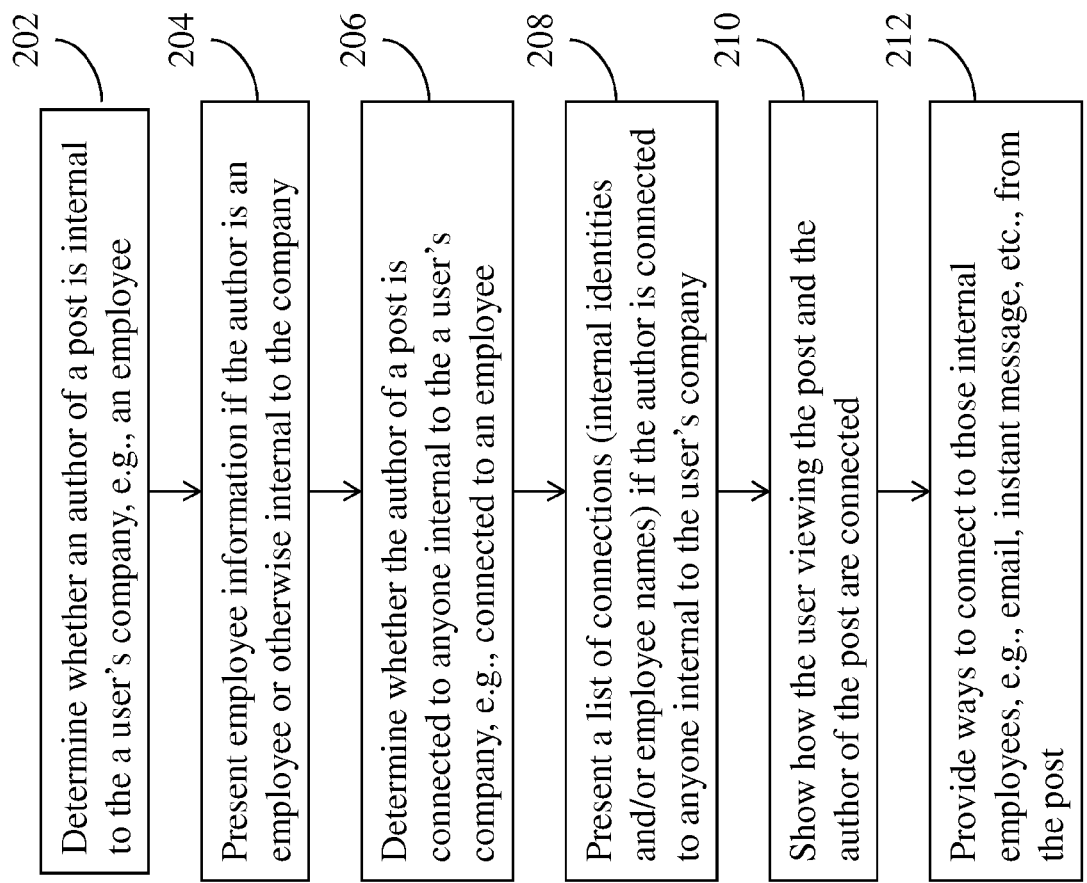
FIG. 2 is another flow diagram illustrating a method of the present disclosure in one embodiment.

FIG. 2 is another flow diagram illustrating a method of the present disclosure in one embodiment. The method may be performed, for example, responsive to a user viewing a post (e.g., a blog) by an author of the post and the user selecting a new tool button as described above. At 202, the method may determine whether the author is an employee of the user's company. This may be achieved by looking up or searching the user entered associations of internal social media and external social media identities. For example, if the author's external identity shown in the post is linked directly with any of the employee's internal identity, then the author may be determined to be an employee of the company. If so, the details of the employee, for example, the employee's profile information may be presented (e.g., displayed) to the user, at 204, e.g., subject to any private information that should not be presented.

If the author is determined not to be an employee, e.g., there is no internal identity that is linked directly to the author's identity on the post, at 206, it is determined whether the author is connected to any internal employees. This may be determined based on searching the company's employees' external identities and associated external social media sites to determine whether the author has a connection to any of the employees' external identities, for example, whether the author is a "friend" of, or otherwise associated with, any of the employees according to the external social media sites. For example, one social media user may make an indication on another social media user's post that he or she 'liked' the post, make comments or others. It may be determined that the author has a connection with one or more of the employees' external identities, if for example, the author of the post made such indications or comments or others.

If it is determined that the author is connected to any internal identities (e.g., employees of the user's company), the list of connections (internal identities and/or employee names) may be provided at 208. Additional information such as hash tags in common, threads in common, likes in common, network contacts in common, and others may also be presented, e.g., displayed.

At 210, it may be also shown how the user viewing the post and the author of the post are connected. For example, it may be shown how the user is connected to the list of connections presented at 208. As an example, it may be discovered that the user is in the same department as those internal employees that are connected to the author.

At 212, the user interface may also provides ways to connect to those internal employees, for example, by instantiating an email session, instant message session, status update (e.g., a microblog post), for example, embedding the posted messages as context, so that a request with context can be forwarded to the internal users. In one aspect, when posting to the internal user, the user interface may post an event on the user's "action required" activity stream or the like with an embedded application that allows the user to review and respond in context (using their bridged account and authorization key) without needing to go to the external site or to re-authenticate.

Yet in another aspect, the concept of looking inward and associating and/or finding the right user(s) need not be limited to external identity associations. Rather, it can be based on users' hash (e.g., expertise) tags. For instance, users may be selected with the "strongest" reputation on those tags on the external network in use. The methodology in one embodiment of the present disclosure uses analytics based on the data available on the internal platform to identify appropriate experts and connect them with an external post. In this way, for instance, users need not have a relationship with the external user posting to get notified of an important topic relating to their expertise or skills.

Still yet in another aspect, users may be found who have bookmarked the same uniform resource locators (URLs) on the internal network that also have an external account. Degree of connection between users and the target user on the external network may be shown, e.g., likes in common, contacts in common, and/or others) for affinity and sorting.

Figure 3:
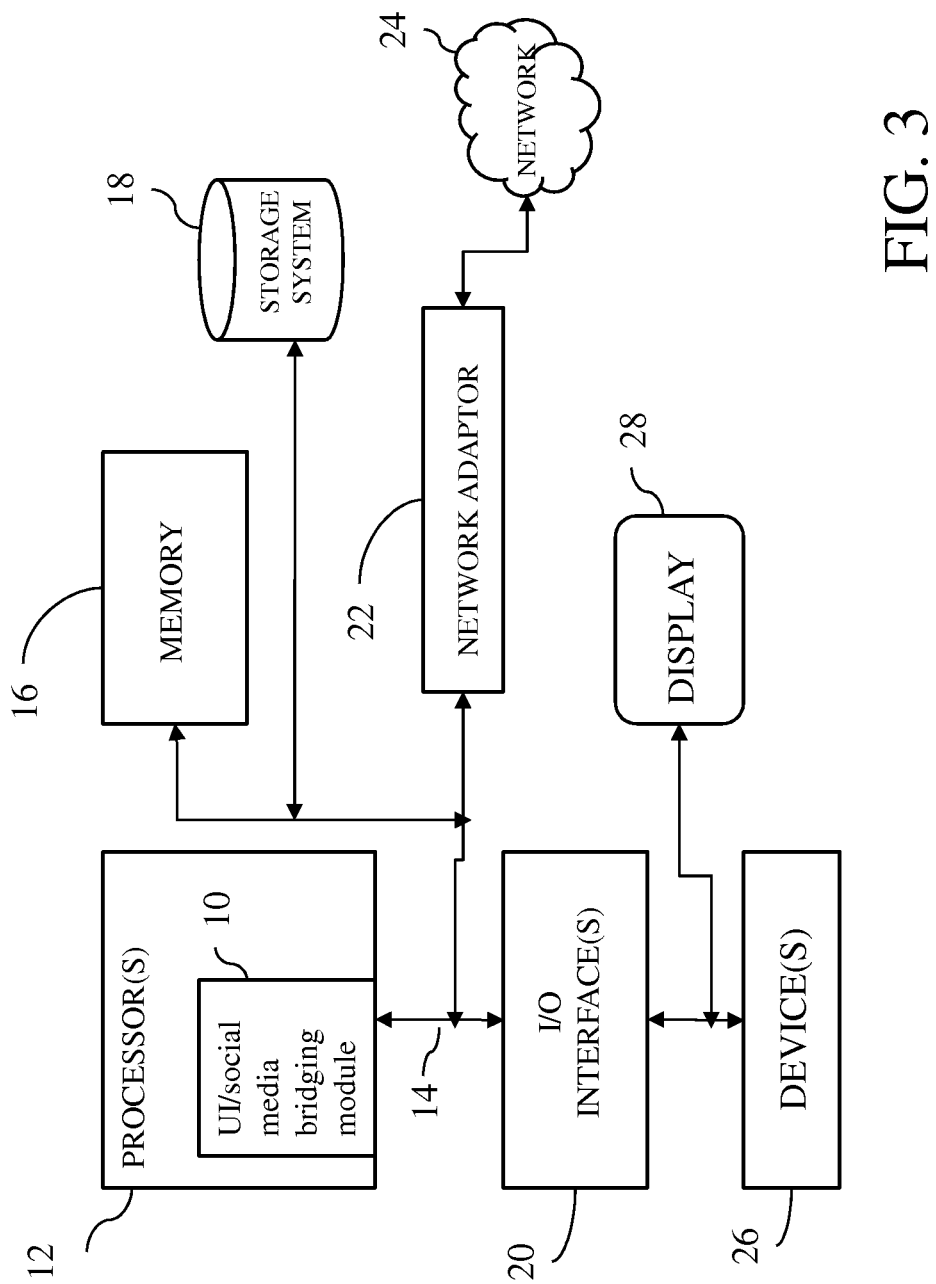
FIG. 3 illustrates a schematic of an example computer or processing system that may implement a social media bridging system in one embodiment of the present disclosure.

FIG. 3 illustrates a schematic of an example computer or processing system that may implement a social media bridging system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer readable storage medium storing a program of instructions executable by a machine to perform a method of bridging relationships across social networks, the method comprising:
    providing a user interface (UI) that allows a user to connect a first identity in a first social community to a second identity in a second social community by allowing the user to specify the first identity and the second identity;

linking the first identity and the second identity responsive to the user specifying the first identify and the second identity;
responsive to a querying user, different and distinct from the user, utilizing the presenting to the querying user with an option to identify one or more connections in the first social community according to at least a criterion with particular members associated with another identity in the second social community;
identifying the one or more connections in the first social community other than the querying user based on the at least one criterion responsive to the querying user selecting the option by searching for linked identities in the first social community and the second social community and filtering the linked identities by the at least one criterion; and
presenting the one or more connections to the querying user, wherein
the user and the one or more connections are members of the first social community, and the querying user is presented with the one or more connections in the first social community and how the querying user is related with the one or more connections in the first social community,
the querying user is a member of the first social community, and
the particular members associated with the other identity in the second social community are not members of the first social community and are not linked to the querying user in the second social community.

2. The computer readable storage medium of claim 1, wherein the at least one criterion comprises at least one of a topic, a product, a selected text, a posting, a group membership, a department, an organization, expertise, a network, and a company.

3. The computer readable, storage medium of claim 2, wherein the UI further allows the querying user to interactively adjust the at least one criterion to filter the one or more connections, and interact with the filtered one or more connections.

4. The computer readable storage medium of claim 3, wherein the interaction is a request to answer a posting.

5. The computer readable storage medium of claim 1, wherein the articular members associated with the other identity in the second social community are determined based on common characteristics between the particular members and the other identity.

6. The computer readable storage medium of claim 5, wherein the common characteristics comprise at least one of common threads, like indications, hash tags, shares, topic, interests and bookmarking a same uniform resource location (URL).

7. The computer readable, storage medium of claim 1, wherein the first social community includes a personal social media group and the other community includes an enterprise social media group.

8. The computer readable storage medium of claim 1, further comprising connecting the querying user to the one or more connections in the first social community at least by instantiating an email session.

9. The computer readable, storage medium of claim 1, further comprising connecting the querying user to the one or more connections in the first social community at least by instantiating an instant message session.

10. The computer readable storage medium of claim 1, wherein the first community and the another social community include social media sites.

11. A system to bridge relationships across social networks, comprising:
a storage device;
a hardware processor; and
a user interface module executing on the hardware processor and operable to
receive, from a user, a specified first identity associated with a first online social community and a specified second identity associated with a second online social community,
link the first identity and the second identity responsive to receiving the first identify and the second identity and store the linked first identity and the second identity in the storage device,
present to a querying user, different and distinct from the user, an option to identify one or more connections in the first social community according to at least one criterion with particular members associated with another identity in the second social community,
identify the one or more connections in the first social community other than the querying user based on the at least one criterion responsive to the querying user selecting the option by searching for linked identities in the first social community and the second social community and filtering the linked identities by the at least one criterion,
present the one or more connections to the querying user, wherein
the user and the one or more connections are members of the first social community, and the querying user is presented with the one or more connections in the first social community and how the querying user is related with the one or more connections in the first social community,
the querying user is a member of the first social community, and
the particular members associated with the other identity in the second social community are not members of the first social community and are not to the querying user in the second social community.

12. The system of claim 11, wherein the at least one criterion comprises at least one of a topic, a product, a selected text, a posting, a group membership, a department, an organization, expertise, a network, and a company.

13. The system of claim 12, wherein the user interface module further allows the querying user to interactively adjust the at least one criterion to filter the one or more connections, and interact with the filtered one or more connections.

14. The system of claim 11, wherein the first social community includes a personal social media group and the second social community includes an enterprise social media group.

15. The system of claim 11, the user interface further operable to connect the querying user to the one or more connections in the first social community at least by instantiating an email session.

16. The system of claim 11, the user interface further operable to connect the querying user to the one or more connections in the first social community at least by instantiating an instant message session.

* * * * *